United States Patent

[11] 3,626,900

[72] Inventor Fred Failla
 172-42 133rd Ave., Jamaica, N.Y. 11434
[21] Appl. No. 62,368
[22] Filed Aug. 10, 1970
[45] Patented Dec. 14, 1971

[54] DISPOSABLE DOG COMMODE
 10 Claims, 7 Drawing Figs.
[52] U.S. Cl. ................................................. 119/1, 119/29
[51] Int. Cl. .................................................. A01k 15/00, A01k 29/00
[50] Field of Search ...................................... 119/1, 29

[56] References Cited
UNITED STATES PATENTS

| | | | |
|---|---|---|---|
| 3,227,137 | 1/1966 | Goldman et al. | 119/1 |
| 3,284,273 | 11/1966 | Prentice | 119/1 X |
| 3,358,647 | 12/1967 | Wilson | 119/1 |
| 3,416,495 | 12/1968 | Wilson | 119/1 |

Primary Examiner—Aldrich F. Medbery
Attorney—C. Hercus Just

ABSTRACT: An inexpensive disposable dog commode comprising a preferably square, flexible sheet of moistureproof material adapted to be spread upon a flat-supporting surface such as a floor, pavement or the like and be held in such position while the dog uses the same, followed by the contraction of the edges and corners of the sheet to enclose the excrement for disposal in a suitable waste receptacle.

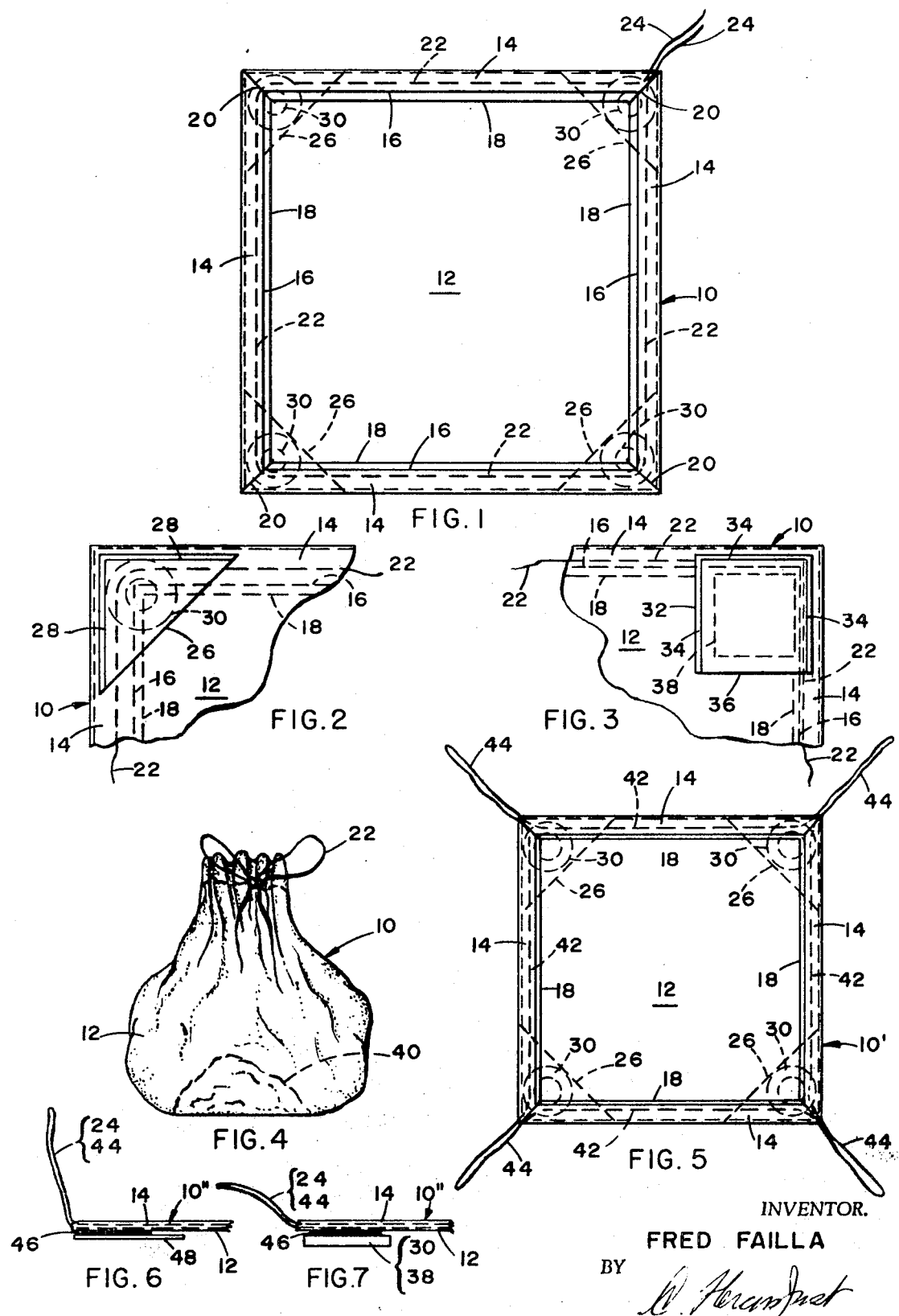

3,626,900

DISPOSABLE DOG COMMODE

BACKGROUND OF THE INVENTION

The maintaining of pets, and especially dogs, in urban areas has increased considerably in modern years and especially in days of unrest and violence when it has been found expedient to maintain a dog for safety purposes. High-population concentration areas, such as apartment buildings and row houses do not afford satisfactory locations for the normal discharge of excrement by dogs, such as in rural areas. Under the circumstances, excrement is frequently deposited in gutters at the sides of streets, and sometimes on pavements, notwithstanding laws and regulations to the contrary. The result is obnoxious and highly unsatisfactory.

Various attempts have been made heretofore to produce receptacles for the excrement of household pets, such as cats and dogs. Such things as litter boxes are well known but these have tendencies to produce objectionable odor and are somewhat messy to clean and restore to sanitary condition.

In the prior art, the extent of the problem in recent years is somewhat reflected by the activity in inventions within the past 5 years, such as U.S. Pat. No. 3,227,137, which discloses a liner for a litter box. The intention of the liner, however, is to permit the removal of the entire litter in which excrement has been deposited and place the same in a suitable waste receptacle. To accomplish the desired use of such arrangement, it is necessary to use a new supply of litter in the new receptacle when restoring the litter box to normal use.

U.S. Pat. No. 3,233,588 discloses a relatively complex sandbox, especially for use by cats. A screen is provided through which sand may be sifted into a pan while the deposited excrement will remain upon the screen for suitable disposal. This device is relatively expensive and ultimately requires the used sand to be replaced by new sand.

Still another U.S. Pat., No. 3,416,495, discloses a rigid plastic pan having means by which a paper liner may be disposed therein and temporarily anchored by means of rubber bands extending across the corners. Such use is satisfactory for indoor use but would be useless, for example, while taking the dog for a walk and the need for excrement disposal equipment becomes necessary.

SUMMARY OF THE INVENTION

It is the principal purpose of the present invention to provide a disposable dog commode comprising a very simple and inexpensive sheet of flexible material, preferably moisture or waterproof and entirely self-contained. The device is intended for a single use and after being used especially by a dog, the flexible sheet is contracted at its edges to form a package for disposal in a suitable waste receptacle. Under such circumstances, one or more of the devices may be carried by the attendant of a dog, in folded condition in a purse or pocket, whereby the same is ready for prompt use, should the need arise while taking the dog for a walk or otherwise.

Another object of the invention is to provide means by which the flexible sheet, which preferably is square, may be retained in flat condition upon a supporting surface such as a floor or pavement so that especially in windy weather, the sheet will not blow away or be dislodged from its intended location of use. The preferred means for maintaining the sheet in flat condition upon such supporting surface comprise suitable, simple and inexpensive weights, such as large metal washers or the like, which readily are inserted in pockets preferably arranged in the corners of the sheet on the surface thereof which is adjacent the supporting surface for the sheet.

A further object of the invention is to form the aforementioned pockets in such a manner that they preferably are triangular and are located in the corners of the flexible sheet, the side edges of the triangle being affixed to the portions of the side edges of the flexible sheet adjacent the corners thereof, whereby the hypotenuse of the triangles are open to receive the weights.

Still another object of the invention is to provide weight-attaching means comprising pressure-sensitive cement affixed, for example, to the flexible sheet in the corner portions thereof and covered by small peelable, protective sheets until the need arises for attaching the weights to the sheet immediately prior to use, whereupon the protective sheets may be quickly stripped from the areas of pressure-sensitive cement, the weights affixed thereto for separable attachment, followed by detachment of the weights and contraction of the side edges and corners of the sheet to form an enclosed package for the excrement in order that it may be neatly and conveniently deposited in a suitable waste receptacle which, in most cities, are readily available in substantially every city block.

Details of the invention and the foregoing objects, as well as other objects thereof, are set forth in the following specification and illustrated in the accompanying drawing, comprising a part thereof.

DESCRIPTION OF THE DRAWING

FIG. 1 is a top plan view of an exemplary disposable dog commode in which one embodiment of the invention is incorporated.

FIG. 2 is a fragmentary bottom plan view of one corner portion of the commode shown in FIG. 1 and illustrating the same embodiment thereof but on a larger scale than employed in FIG. 1 in order to illustrate certain characteristics of the invention to greater advantage.

FIG. 3 is a view similar to FIG. 2, but showing a slightly different embodiment of the corner portions of the commode from those illustrated in FIGS. 1 and 2.

FIG. 4 is an exemplary side elevation of the commode shown in FIG. 1 when the sides and corners thereof have been contracted to form a package in which the deposited excrement is enclosed and said package is ready for disposal into a waste receptacle.

FIG. 5 is a top plan view, on a slightly smaller scale than used in FIG. 1, to illustrate a still further embodiment of the invention.

FIG. 6 is a fragmentary edge view of one corner portion of a disposable dog commode in which different means from those employed in the preceding figures are used to secure weights to the corner portions of the flexible sheet comprising the commode.

FIG. 7 is a view similar to FIG. 6 but illustrating a protective sheet illustrated in FIG. 6 being removed and a weight being attached to an exemplary corner of the commode for separable connection thereto at the conclusion of use of the commode.

DESCRIPTION OF THE PREFERRED EMBODIMENTS

Referring to FIG. 1, the disposable dog commode 10 comprising the present invention preferably is formed from a sheet 12 of flexible, moistureproof or waterproof material, such as one of the many varieties of waterproof synthetic resin sheet materials, thin waterproof paper, or metal foil. The shape of the commode 10 preferably is square, as illustrated in FIGS. 1 and 5; however, this is not absolutely essential and other geometrical configurations, such as rectangular, hexagonal, etc. may be employed. A square shape, however, minimizes the cost of producing the same with less waste than when other geometrical configurations are used.

The edges of the sheet 12 of material are folded in upon one surface of the sheet, as shown in FIG. 1, to form hems 14 along each edge. Said hems may be formed, for example, especially when the material from which the sheet 12 is formed comprises a thermoplastic resin, by heat sealing the folded hem portions along lines 16 so as to connect the terminal edge portions 18 of the sheet to said upper surface of the sheet 12 as viewed in FIG. 1.

In order to form a neat arrangement of hems 14, the corners of the stock sheet of material 12 may be cut at a 45° angle at predetermined locations in order that when the edge portions are folded to form the hems 14, the ends of said edge portions will abut each other at a 45° angle line 20, and thereby produce a neat arrangement. The hems 14 contain a drawstring 22, which is illustrated in the form of a heavy dotted line, and the ends 24 thereof extend through the diagonal slit at one corner of the commode 10 which has now been formed as a result of the foregoing operations. However, additional elements are added thereto, as follows, in accordance with the invention.

The commode 10 is provided with several embodiments of means to hold the sheet-type commode flatly upon a supporting surface such as a floor, sidewall, pavement or the like. One such embodiment is illustrated in FIGS. 1 and 2 which comprises triangular configurations of sheet material similar to the material 12, to form pockets 26. Where, for example, the pockets 26 are formed from thermoplastic sheet material, the side edges thereof may be firmly affixed to the so-called bottom surface of the commode 10, which is uppermost in FIG. 2 but lowermost in FIG. 1, for contact with the supporting surface. The affixing preferably is accomplished by heat-sealing said side edges of the triangular pocket 26 along heat-sealed lines 28, clearly shown in FIG. 2. The hypotenuse of the pocket 26 is unsealed and therefore, is open for the reception of a removable weight 30, such as a large size iron washer of 2-inch diameter, for example.

Referring to FIG. 3, a slightly different embodiment of weight-arrangement for the corners of the commode 10 is illustrated. In basic principle, it is similar to the embodiment specifically shown in FIGS. 1 and 2. It will be seen that the exemplary corner of the sheet 12 of commode 10, shown in FIG. 3, is provided with a relatively square pocket 32, formed, for example, from the same material as the sheet 12 and, when thermoplastic synthetic resin is utilized, the pocket may be affixed along three sides by heat-sealing continuous or interrupted lines 34, whereby there is an open side 36 for the reception of a weight 38 which, for example, may be a piece of sheet steel about 2 inches square and three-sixteenths of an inch in thickness, or any other appropriate size. Small lead weights such as used in certain types of old-fashioned tailoring operations likewise are suitable. Preferably, the edges of the weights should be rounded so as not to tear the synthetic resin material which, under normal circumstances, may be very thin so as to minimize the cost thereof.

DESCRIPTION OF USE

It can be appreciated from the foregoing description that the commode 10 may be manufactured very inexpensively. They may be merchandised by packaging the same in folded condition in quantities of any suitable number, such as a dozen, 25, 100, or otherwise. When the owner of a dog takes the dog for a walk, especially on that normal late night walk when the dog should prepare itself for staying indoors for the rest of the night without molesting the owner in any way, the owner may place one or two of such folded commodes within a purse, if a feminine owner, or the pocket of a jacket, if a masculine owner, together with the required number of weights. When the dog is ready to use the commode, the weights may quickly be placed in the pockets at the corners of the commode and the same is spread upon a suitable supporting surface with the pockets lowermost, against such supporting surface, thereby holding the commode in operative position. Following use by the dog, the corners of the commode 12 may successively be engaged to bring the same together and incidentally, automatically cause the weights to drop therefrom, especially when the pockets are of triangular shape but this is also possible when the pockets are of square shape as shown in FIG. 3. The drawstring 22 then may be tightened to contract the commode into an enclosing and disposal condition as shown in exemplary manner in FIG. 4, in which the excrement 40 is illustrated in exemplary manner. The resulting package then is highly convenient to be disposed in a suitable disposal receptacle, such as a conventional trash receptacle, which are placed at convenient intervals in most highly congested city areas. As a result, the dog is made comfortable and the street, sidewalks, and gutters remain clean as far as that particular dog is concerned.

Referring to FIG. 5, a slightly different embodiment of the invention is illustrated which, very largely is similar to that shown in FIGS. 1 and 2, in that the exemplary triangular pockets 26 are illustrated, for the reception of weights 30. Also, the hems 14 are formed substantially in the same manner as illustrated with respect to FIG. 1. However, rather than utilizing a drawstring, the embodiment shown in FIG. 5 employs a single string 42 which, preferably, extends continuously through the four seams 14, and at the corners of the commode 10', the string 42 has elongated loops 44 extending therefrom. In use, it is only necessary to pick up the strings 44 at the completion of use by the dog so as to permit discharge of the weights 30 from the pockets 26, and also enable diagonally opposite loops 44 successively to be tied in knots and thereby form at least a highly satisfactory package within which the excrement is enclosed for deposit in a waste receptacle, notwithstanding the fact that the edges of the commode may not be contracted and puckered as closely as under the conditions where a drawstring is employed.

A still further embodiment of the invention is illustrated in FIGS. 6 and 7, particularly with regard to the manner in which the supporting weights are connected to the corners of the sheet comprising the commode. Referring to FIG. 6 in particular, for example, it will be seen that the sheet 12, which comprises the commode, has a hem 14 therein and either the drawstring 24 or the tying loops 44 extend from the exemplary corner of the commode 10'', illustrated fragmentarily in FIG. 6. Attached to the surface of the commode 12 which will be placed nearest the supporting surface such as a floor or pavement, is a thin layer of pressure-sensitive cement 46, of suitable area, and over the same, a small sheet of protective material 48 is applied, such as a thin sheet of varnished paper or the like, which is readily peelable from the pressure-sensitive cement 46.

Referring to FIG. 7, it will be seen that after the protective sheet 48 has been removed from the pressure-sensitive cement 46, one of the weights 30 or 38, as respectively shown in FIGS. 1, 2 and 3, may be detachably secured to each corner of the commode 10'' to hold the same in the same manner as the embodiment of the weights shown in the preceding figures while the commode is in use. Following the use of the commode, the weights readily may be stripped from the pressure-sensitive cement and saved for further use with other commodes.

From the foregoing, it will be seen that the present invention provides a highly sanitary, convenient and inexpensive disposable commode, primarily intended for use by dogs but also susceptible to use by other pets to which the commode use may be adapted. It is also to be understood that while the foregoing description has primarily been concerned with the use of thermoplastic synthetic resin sheet material to form both the commode and the weight-receiving pockets thereof, it is to be understood that other types of material may be utilized, such as waterproof paper, metal foil and the like. When forming seams and attaching pockets of such material to the sheet of material comprising the main portion of the commode, other types of connecting means may be employed, such as suitable cements to form the seams and attach the pockets thereto for the reception of weights.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A disposable dog commode comprising in combination a substantially square, thin, flexible, moisture-proof sheet of material, means to hold spaced portions thereof flatly upon a supporting surface, and edge contractable closure means to hold said edges of said sheet contracted to enclose excrement therein for disposal in a suitable waste receptacle.

2. The disposable dog commode according to claim 1 in which the means to hold spaced portion of the commode flatly upon a supporting surface comprise weights.

3. The disposable dog commode according to claim 2 in which the commode is provided with pockets in the corners of the same to receive said weights.

4. The disposable dog commode according to claim 3 in which said pockets are affixed to the surface of the sheet comprising said commode which is disposed adjacent the surface which supports said commode when in use.

5. The disposable dog commode according to claim 3 in which said pockets are triangular in shape and the side edges thereof are connected along corresponding side edges of the sheet which forms the main portion of the commode, thereby leaving the hypotenuse of the triangle open to receive said weight and permit removal thereof from said pockets.

6. The disposable dog commode according to claim 1 in which said means to hold said edges contracted comprises a drawstring and said flexible sheet comprising said commode having hems formed along all edges thereof to receive said drawstring.

7. The disposable dog commode according to claim 1 in which said means to hold said edges contracted comprises a tie-string extending along all edges of the sheet of material comprising said commode and having portions extending radially outward at the corners of said commode to permit tieing the corners of the commode together to form a suitable receptacle for disposal of enclosed excrement in a suitable waste disposal receptacle.

8. The disposable dog commode according to claim 1 in which said means to hold spaced portions of said commode flatly upon a supporting surface comprise weights detachably connected to the corner portions of said sheet by pressure-sensitive cement.

9. The disposable dog commode according to claim 8 in which areas of suitable size of cement are disposed upon said sheet in the corner portions thereof and include peelable protective sheet material tentatively adhering to said cement until ready for use.

10. The disposable dog commode according to claim 9 in which said means to hold the edges of said sheet contracted comprise string means extending along the edges of the sheet comprising said commode.

* * * * *